(12) United States Patent
Rieth et al.

(10) Patent No.: US 9,074,065 B2
(45) Date of Patent: *Jul. 7, 2015

(54) LATEX COATING COMPOSITIONS INCLUDING CARBOXY ESTER KETAL COALESCENTS, METHODS OF MANUFACTURE, AND USES THEREOF

(75) Inventors: Lee R. Rieth, Plymouth, MN (US); Cora M. Leibig, Maple Grove, MN (US); Jason D. Pratt, Minneapolis, MN (US); Mike Jackson, Louisville, KY (US)

(73) Assignee: SEGETIS, INC., Golden Valley, MN (US)

( * ) Notice: Subject to any disclaimer, the term of this patent is extended or adjusted under 35 U.S.C. 154(b) by 839 days.

This patent is subject to a terminal disclaimer.

(21) Appl. No.: 13/208,831

(22) Filed: Aug. 12, 2011

(65) Prior Publication Data

US 2012/0041110 A1    Feb. 16, 2012

Related U.S. Application Data

(60) Provisional application No. 61/379,853, filed on Sep. 3, 2010, provisional application No. 61/373,053, filed on Aug. 12, 2010.

(51) Int. Cl.
| | |
|---|---|
| *C08K 5/15* | (2006.01) |
| *C08K 5/1565* | (2006.01) |
| *C08K 5/156* | (2006.01) |
| *C08K 5/06* | (2006.01) |

(52) U.S. Cl.
CPC .............. *C08K 5/1565* (2013.01); *C08K 5/06* (2013.01); *C08K 5/156* (2013.01)

(58) Field of Classification Search
CPC ........ C08K 5/06; C08K 5/1565; C08K 5/156; C08L 13/02
USPC ....................... 524/108; 427/385.5
See application file for complete search history.

(56) References Cited

U.S. PATENT DOCUMENTS

| | | | |
|---|---|---|---|
| 1,934,309 A | 11/1933 | Hoover | |
| 2,008,720 A | 7/1935 | Lawson | |
| 2,260,261 A | 10/1941 | Morey et al. | |
| 2,556,135 A | 6/1951 | Croxall et al. | |
| 2,654,723 A | 10/1953 | Greene | |
| 2,985,536 A | 5/1961 | Stein et al. | |
| 3,201,420 A | 8/1965 | Fuzesi et al. | |
| 3,658,789 A | 4/1972 | Fried | |
| 3,855,248 A | 12/1974 | Lannert et al. | |
| 4,460,767 A | 7/1984 | Matsumura et al. | |
| 4,737,426 A | 4/1988 | Roth | |
| 4,792,411 A | 12/1988 | Walsh | |
| 4,806,448 A | 2/1989 | Roth | |
| 5,013,543 A | 5/1991 | Mercado et al. | |
| 5,093,111 A | 3/1992 | Baker et al. | |
| 5,419,848 A | 5/1995 | Van Eenam | |
| 5,489,448 A | 2/1996 | Jackson et al. | |
| 5,516,459 A | 5/1996 | Van Eenam | |
| 5,700,522 A | 12/1997 | Nonweiler et al. | |
| 5,705,087 A | 1/1998 | Mushrush et al. | |
| 5,917,059 A | 6/1999 | Bruchmann et al. | |
| 5,998,092 A | 12/1999 | McCulloch et al. | |
| 6,010,995 A | 1/2000 | Van Eenam | |
| 6,034,118 A | 3/2000 | Bischofberger et al. | |
| 6,306,249 B1 | 10/2001 | Galante et al. | |
| 6,423,480 B2 | 7/2002 | Ichiki | |
| 6,423,677 B1 | 7/2002 | Van Eenam | |
| 6,451,223 B1 | 9/2002 | Jeon | |
| 6,528,025 B1 | 3/2003 | Boesch et al. | |
| 6,627,181 B1 | 9/2003 | Busch, Jr. et al. | |
| 6,749,998 B2 | 6/2004 | Schwartzkopf et al. | |
| 6,806,392 B2 | 10/2004 | Boesch et al. | |
| 7,094,395 B1 | 8/2006 | Qu et al. | |

(Continued)

FOREIGN PATENT DOCUMENTS

| | | |
|---|---|---|
| CA | 1000285 | 11/1976 |
| CA | 2347255 A1 | 2/2004 |
| DE | 3220035 A1 | 1/1983 |
| DE | 10036423 A1 | 3/2001 |
| EP | 012543 A1 | 6/1980 |
| EP | 0308956 A2 | 3/1989 |
| EP | 0507190 A1 | 10/1992 |
| EP | 0913463 A1 | 5/1999 |
| FR | 1445013 | 7/1966 |
| JP | 284327 | 9/1953 |

(Continued)

OTHER PUBLICATIONS

Doolittle, Arthur K., "Application of a Mechanistic Theory of Solvent Action to Plasticizers and Platicization", Journal of Polymer Science, vol. 2, No. 2 (1947) 121-141.

(Continued)

Primary Examiner — Ling Choi
Assistant Examiner — Wenwen Cai
(74) Attorney, Agent, or Firm — Cantor Colburn LLP

(57) ABSTRACT

A latex coating composition is disclosed, comprising a latex polymer binder; water; and a ketal adduct of formula (1)

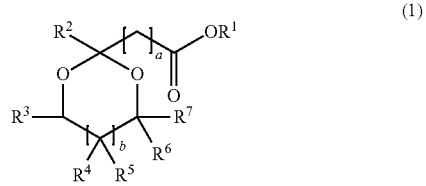

wherein $R^1$ is C1-6 alkyl, $R^2$ is hydrogen or C1-3 alkyl, each $R^3$, $R^4$, and $R^5$ is independently hydrogen or C1-6 alkyl, $R^6$ and $R^7$ are each independently hydrogen or C1-6 alkyl, a is 0-3, and b is 0-1.

39 Claims, 1 Drawing Sheet

(56) References Cited

U.S. PATENT DOCUMENTS

| | | | |
|---|---|---|---|
| 7,179,775 | B2 | 2/2007 | Foster |
| 7,705,081 | B2 | 4/2010 | Porzio et al. |
| 2003/0167681 | A1 | 9/2003 | Delgado Puche |
| 2004/0024260 | A1 | 2/2004 | Winkler et al. |
| 2004/0147602 | A1 | 7/2004 | Smith et al. |
| 2004/0157759 | A1 | 8/2004 | Scherubel |
| 2004/0167245 | A1 | 8/2004 | Chappelow et al. |
| 2005/0233927 | A1 | 10/2005 | Scherubel |
| 2006/0069230 | A1 | 3/2006 | Papisov |
| 2006/0207037 | A1 | 9/2006 | Fadel et al. |
| 2006/0208226 | A1 | 9/2006 | Maze et al. |
| 2006/0211855 | A1 | 9/2006 | Doring et al. |
| 2007/0079722 | A1 | 4/2007 | Parish |
| 2007/0111917 | A1 | 5/2007 | Lang et al. |
| 2007/0161530 | A1 | 7/2007 | Kaneda et al. |
| 2008/0096785 | A1 | 4/2008 | Egbe et al. |
| 2008/0124426 | A1 | 5/2008 | Kobler et al. |
| 2008/0188603 | A1 | 8/2008 | Porzio et al. |
| 2008/0242721 | A1 | 10/2008 | Selifonov et al. |
| 2008/0305978 | A1 | 12/2008 | Wietfeldt et al. |
| 2011/0196081 | A1 | 8/2011 | Kwon et al. |
| 2011/0274634 | A1* | 11/2011 | Rieth et al. ........................ 424/61 |
| 2011/0300083 | A1* | 12/2011 | Yontz et al. ........................ 424/59 |

FOREIGN PATENT DOCUMENTS

| | | | |
|---|---|---|---|
| JP | 2800437 | A | 9/1953 |
| JP | 4217972 | | 8/1992 |
| JP | 2006143702 | A | 6/2006 |
| SU | 722912 | | 3/1980 |
| WO | 9412489 | A1 | 6/1994 |
| WO | 2004099173 | A1 | 11/2004 |
| WO | 2005095378 | A2 | 10/2005 |
| WO | 2005097723 | A2 | 10/2005 |
| WO | 2005097724 | A1 | 10/2005 |
| WO | WO2007062158 | A2 | 5/2007 |
| WO | 2008089463 | A2 | 7/2008 |
| WO | 2008098375 | A1 | 8/2008 |
| WO | WO2009032905 | A1 | 3/2009 |
| WO | 2010/075330 | | 7/2010 |

OTHER PUBLICATIONS

Transmittal and International Search Report for PCT/US2011/050651, mailed Apr. 26, 2012, 6 pages.
Written Opinion of the International Searching Authority for PCT/US2011/050651, mailed Apr. 26, 2012, 7 pages.
Boehm, R., "Knowledge on cyclic ketals. Part 11: Synthesis of some new derivatives and separation of their isomers," Pharmazie 36(5): 329-330 (1981).
Brigl, et al., "The Reaction of the Pyruvic Acid with Glycerin," Annalen der Chemie 476: 215-232 (Received Oct. 7, 1929).
Briol, et al., "Reaction of pyroracemic acid with glycerol," Ann. 476: 215-232 (1929).
Calinaud, et al., "Cyclic acetal series. XIII. Opening of 4-oxo and 4-hydroxy-3,6,8-trioxabicyclo[3.2.1]octane and 3-pxp-2,5,7-trioxabicyclo[2.2.2]octane rings by lithium aluminum hydride and methylmagnesium iodide," Carbohydrate Research 30(1) 35-43 (1973).
Carey, et al., "Advanced Organic Chemistry, Second Edition, Part B: Reactions and Synthesis," Plenum Press 539-552 (1983).
Cuiling, et al., "Synthesis of Levulinic Ketals with Furfuryl Alcohol as Raw Material," Journal of Huagiao University (Nature Science) 23(3): 257-259 (2002) (English Translation).
Eastman Chemical Company. (May 2006). Selecting Coupling Agents for Multi-phase Models. Retrieved Aug. 13, 2009, from http://www.eastman.com/Literature Center/M/M207.pdf.
Gelas, et al., "Synthese du 4-oxo et de 4-hydroxy-3,6,8-trioxabicyclo[3.2.1]octanes," Carbohydrate Research 30(1): 21-34 (1973) (with English abstract).
Grosu, et al., "Stereochemistry and NMR Spectra of Some New Unsymmetrical Substituted 2,2-Dialkyl-1,3-Dioxanes," Revue Roumaine de Chimie 41(3-4): 259-263 (1996).
Gutsche, et al., "Reactions of Ethyl Diazoacetate with Aromatic Compounds Containing Hetero Atoms Attached to the Benzyl Carbon," J. Am. Chem. Soc. 76: 2236-2240 (1954).
Haskelbhrg, L., "The preparation of glycerol esters of amino acids," Compt. rend. 190270-190272 (1930).
Hegde, et al., "The Kinetics and Thermodynamics of Bicyclic Ketal Formation: An Application to the Synthesis of the Zaragozic Acids," Tetrahedron 53(32): 11179-11190 (1997).
Horsfall, et al., "Fungitoxicity of Dioxanes, Dioxolanes, and Methylenedioxybenzenes," The Connecticut Agricultrual Experiment Station New Haven, Bulletin 673: 1-44, Jun. 1965.
Lukes, Robert M., Preparation of Methyl Esters Containing the 1,3-Dioxane or 2,4,8,10-Tetroxaspiro[5.5]undecane Structure by Ketal Exchange, 26: 2515-2518 (1961).
Rohm and Haas. (Apr. 1998). Maincote PR-71 Technical Data Sheet. Retrieved Mar. 4, 2009 from http://www.rohmhaas.com/assets/attachments/business/pcm/maincote_pr/maincote_pr071/tds/maincote_pr-71.pdf.
Meltzer, et al., "2,2-Disubstituted 1,3-Dioxolanes and 2,2-Disubstituted 1,3-Dioxanes," JOC 25: 712-715 (1960).
Meskens, Frans A.J., "Methods for the Preparation of Acetals from Alcohols or Oxiranes and Carbonyl Compounds," Synthesis 501-522 (1981).
Nakamura, et al., "Study on Ketalization Reaction of Poly (vinyl alcohol) by Ketones. IX. Kinetic Study on Acetalization and Ketalization Reaction of 1,3-Butanediol as a Model Compound for Poly (vinyl alcohol)," Polymer Science Part B: Polymer Physics 35(9): 1719-1731 (2000).
Newman, et al.,"Kinetic and Equilibrium Studies of Cyclic Ketal Formation and Hydrolysis," The Journal of the American Oil Chemist's Society 80: 6350-6355 (1958).
Olson, Edwin S., "Subtask 4.1—Conversion of Lignocellulosic Material to Chemicals and Fuels," Final Report for U.S. Dept. of Energy, National Energy Technology Laboratory, Cooperative Agreement No. DE-FC26-98FT40320 (Jun. 2001).
Ono, et al., "Synthesis and Properties of Soap Types of Cleavable Surfactants Bearing a 1,3-Dioxolane Ring Derived from Long-chain Epoxides and Ethyl Levulinate," J. Jpn. Oil Chem. Soc. 42(12): 965-971 (1993).
Rohm and Haas Rhoplex SG-10M Technical Data Sheet. (Jun. 1997). Retrieved Mar. 9, 2009, from http://www.rohmhaas.com/assets/attachments/business/pcm/rhoplex_sg/rhoplex_sg-10m/tds/rhoplex_sg-10m.pdf.
Wedmid, et al., "Long-Chain Stereomeric 2-Alkyl-4-methoxycarbonyl-1,3-dioxolanes in Glycerol Acetal Synthesis," J. Org. Chem. 42(22): 3624-3626 (1977).
Yamaguchi, Masahiko, "Synthesis of Polycyclic Aromatic Compounds via Polyketides," Yuki Gosei Kagaku Kyokaishi 45(10) 969-982 (1987) (Chinese—Translation of Abstract Only).
Yang, et al., "Investigation of homopolymerization rate of perfluoro-4,5-substituted-2-methylene-1,3-dioxolane derivatives and properties of the polymers," Journal of Flourine Science 127: 277-281 (2006).
Yulan, et al., "Synthesis of Ketals of 4-Oxopentanoates," Lanzhou Daxue Xuebao, Ziran Kexueban 30(2): 66-70 (1994).
Zhang, et al., "Synthesis of Ketals of 4-Oxopentanoates," Lanzhou Daxue Xuebao, Ziran Kexueban 30(2): 66-70 (1994).
International Search Report for PCT/US2011/047620, mailed Mar. 22, 2012, 7 pages.
Written Opinion of the International Searching Authority for PCT/US2011/047620, mailed Mar. 22, 2012, 5 pages.
Brigl, Percy, et al., "The Reaction of the Pyruvic Acid with Glycerin," Annalen der Chemie 476: p. 215-232, Received Oct. 7, 1929, (with English translation).
Holmberg, Krister, "Surfactants with controlled half-lives", Current Opinion in Colloid & Interface Science, vol. 1, Issue 5, p. 572-579 (Oct. 1996).
Transmittal and International Preliminary Report on Patentability for PCT/US2011/047620, mailed Feb. 21, 2013, and Written Opinion of the International Searching Authority mailed Mar. 22, 2012, 8 pages.
Black, Cline, et al., "The Solubility of Water in Hydrocarbons", The Journal of Chemical Physics, vol. 16, pp. 537-543 (1948).

* cited by examiner

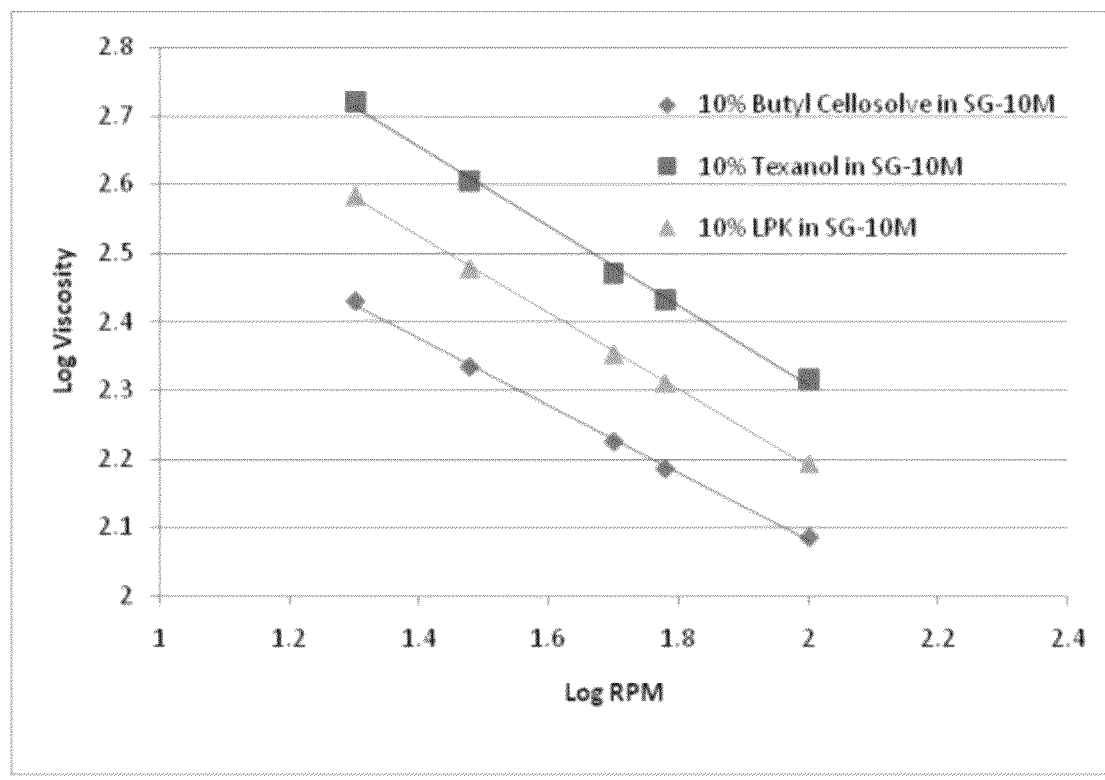

LATEX COATING COMPOSITIONS INCLUDING CARBOXY ESTER KETAL COALESCENTS, METHODS OF MANUFACTURE, AND USES THEREOF

CROSS REFERENCE TO RELATED APPLICATION

The application claims the benefit of U.S. Provisional Application Nos. 61/373,053 filed on Aug. 12, 2010, and 61/379,853, filed Sep. 3, 2011, which in incorporated by reference herein in its entirety.

BACKGROUND

This disclosure relates to latex coating compositions, in particular latex compositions comprising a carboxy ester ketal, methods for the manufacture of the compositions, and uses of the compositions.

Latex coating resins are water-borne emulsions of sub-micrometer polymer particles. The emulsions are formed by emulsion polymerization, and then can be further formulated for a variety of applications, for example latex paints, caulks, sealants, adhesives, mastics, and inks Latex coating compositions, can be formulated with a variety of additives, among them a coalescing solvent or "coalescent." Coalescing solvents promote film formation. The coalescing solvent serves as a plasticizer, softening the resin particles by reducing the glass transition temperature (Tg) of the particles, and enabling them to fuse into a continuous film. For example, a latex paint composition containing a coalescing solvent is coated on a substrate and then cures by coalescence, where the water and the coalescing solvent evaporate sequentially or simultaneously. During evaporation, the coalescing solvent softens the latex polymer binder particles, fusing them together into an entangled polymer film so that the polymer binder will not redissolve in the water/solvent that originally carried it.

Coalescing solvent selection is guided by considerations such as solubility, reactivity, volatility, toxicity, environmental profile, and cost. While a number of solvents are available and in commercial use, there remains a need in the art for new solvents that offer a favorable combination of these characteristics. Further, there is an increasing desire for "bio-sourced" solvents that can be used as replacements for petroleum-sourced solvents. Few bio-source solvents are available that can meet the increasingly demanding technical requirements for latex coating compositions and coatings, including paints, sealants, adhesives, mastics, and inks Even where such solvents are available, the solvents can have various drawbacks. For example, ethanol is a versatile solvent that is readily available from bio-based sources, but its high flammability and high volatility limits its use in many applications. A further drawback of many bio-sourced solvents is that the chemical and physical properties of the solvents can only be adjusted to a limited extent.

SUMMARY

There accordingly remains a need in the art for coalescing solvents for latex coating compositions, in particular bio-sourced solvents that offer an advantageous combination of one or more attributes such as solubility with one or more components, reactivity, volatility, toxicity, environmental profile, and cost. It would be of further advantage if such solvents could be readily modified to adjust the chemical and physical properties of the solvent to meet the needs of a specific application. It would be advantageous if the bio-sourced solvents provided latex coating compositions that meet one or more customer needs such as good viscosity, balanced dry times, or good flow and leveling in the latex coating composition; or good adhesion of the dry coating, good scrub resistance, durability, impact flexibility, water resistance, chemical resistance, stain resistance, gloss, or hardness in the resultant dry coating.

A latex coating composition comprises a latex polymer binder; water; and a ketal adduct of formula (1)

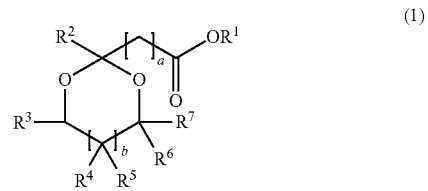

wherein
$R^1$ is C1-6 alkyl,
$R^2$ is hydrogen or C1-3 alkyl,
each $R^3$, $R^4$, and $R^5$ is independently hydrogen or C1-6 alkyl,
$R^6$ and $R^7$ are each independently hydrogen or C1-6 alkyl,
a is 0-3, and
b is 0-1.

A method of preparing the latex coating composition comprises combining an aqueous latex polymer binder and the ketal adduct of formula 1.

A method of coating a substrate comprises contacting the above-described latex coating composition with a surface of a substrate to form a coating; and drying the coating.

A coated substrate comprises a substrate having a surface; and a coating disposed on the surface, wherein the coating comprises a latex polymer binder; and a ketal adduct of formula (1).

The above described and other embodiments are further described in the drawings and detailed description that follow.

BRIEF DESCRIPTION OF THE DRAWING

The FIGURE is a graph showing log viscosity vs. log spindle rpm (shear rate) for coating formulations containing Rhoplex SG10M latex and 10% coalescent (TPM, as Texanol, from Eastman Chemical Company), EGBE (ethylene glycol butyl ether, as Butyl Cellosolve from The Dow Chemical Company), and EtLPK).

DETAILED DESCRIPTION

The inventors hereof have discovered that the ketal adducts of ketocarboxy esters, in particular levulinate esters, offer a combination of properties that are useful for latex coating compositions, in particular latex paint compositions and other latex compositions such as caulks, sealants, adhesives, mastics, and inks The broad solubilities of the ketal adducts renders them useful in a broad variety of polymer latex types. A further advantage is that certain of the ketal adducts, such as the levulinate ester ketals, can be derived from biological feedstocks. The ketal adducts can therefore be utilized to reduce or replace petroleum-sourced compounds in the latex coating compositions.

The ketocarboxy ester ketals, sometime referred to herein as "ketal adducts," have the general formula (1):

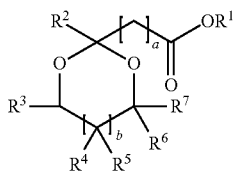

(1)

wherein
$R^1$ is C1-6 alkyl,
$R^2$ is hydrogen or C1-3 alkyl,
each $R^3$, $R^4$, and $R^5$ is independently hydrogen or C1-6 alkyl,
$R^6$ and $R^7$ are each independently hydrogen or C1-6 alkyl,
a is 0-3, and
b is 0-1.

More specifically, $R^1$ is C1-6 alkyl, $R^2$ is methyl, each $R^3$, $R^4$, and $R^5$ is independently hydrogen or C1-3 alkyl, $R^6$ is hydrogen or C1-6 alkyl, $R^7$ is hydrogen, a is 1-3, and b is 0-1.

Even more specifically $R^1$ is C1-6 alkyl, $R^2$ is methyl, $R^3$ is hydrogen, $R^6$ is hydrogen or C1-3 alkyl, $R^7$ is hydrogen, a is 2-3, and b is 0.

In a specific embodiment $R^1$ is C1-alkyl, $R^2$ is methyl, $R^3$ is hydrogen, $R^6$ is hydrogen, methyl, or ethyl, $R^7$ is hydrogen, a is 2, and b is 0.

Still more specifically, the ketal adduct of formula (1) the 1,2-propanediol adduct of a levulinic acid ester, having formula (1a):

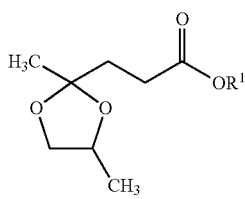

(1a)

wherein $R^1$ is as defined above, specifically a C1-4 alkyl, more specifically ethyl or butyl, and $R^9$ is hydrogen or C1-4 alkyl. Ethyl levulinate propylene glycol ketal ("EtLPK") is obtained when $R^1$ is ethyl in formula (1a).

The ketal adducts of formula (1) can be obtained by the acid-catalyzed reaction of the corresponding ketoacid ester of formula (2) with a diol of formula (3):

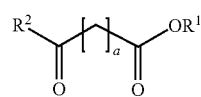

(2)

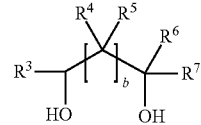

(3)

wherein each of $R^1$, $R^2$, $R^3$, $R^4$, $R^6$, and $R^7$, and the integers a and b are as defined above. Reaction conditions are described in WO 09/032905, for example. Many of the compounds falling within the scope of formulas (2) and (3) can be bio-sourced. The ketal adducts thus provide an entry point for a broad variety of bio-sourced solvents. For example, levulinic acid is produced by the thermochemical treatment of various carbohydrates such as cellulose; subsequent esterification with bio-sourced alkanols and ketalization of the levulinate ester with polyhydroxy compounds such as propylene glycol produces a bioderived solvent.

It has been found that the ketal adducts (1), specifically (1a), find use in latex coating compositions. Without being bound by theory, it is believed that the ketal adducts function primarily as a coalescing solvent during the formation of coatings. However, it is to be understood that the ketal adducts can have more than one function, including one or more of solubilization, solvent coupling, surface tension reduction, and the like. In a highly advantageous feature, selection of the specific $R^1$, $R^2$, $R^3$, $R^4$, $R^6$, and $R^7$ groups, and a and b in the ketal adducts of formula (1) allows the chemical and physical properties of the ketal adducts to be adjusted to achieve the desired combination of properties, for example, solubilizing activity and volatility.

In a specific embodiment the groups $R^1$, $R^2$, $R^3$, $R^4$, $R^6$, and $R^7$ groups, and integers a and b are selected to provide a desired solubilizing activity, that is, the ability of the ketal adduct to solubilize a solute. Where needed, the presence of ester and ether functionality allows interaction of the ketal adduct with a variety of solute functional groups.

The ketal adducts (1), specifically (1a), are further advantageous in that the structure of the compounds can be adjusted to alter the volatility of the compounds. Volatility manifests itself in a number of key properties for coalescing solvents, including boiling point, vapor pressure, relative evaporation rate, flammability, odor, and volatile organic compound (VOC) content. The desired volatility profile of a solvent varies considerably by application, and there are often conflicting considerations. For instance, highly volatile solvents require less energy to remove after use, but in many cases also require special handling due to higher flammability. Appropriate selection of $R^1$, $R^2$, $R^3$, $R^4$, $R^6$, and $R^7$ groups, and integers a and b can further provide a selected volatility. EtLPK in particular is of acceptably low volatility and low flammability.

The ketal adducts (1), specifically (1a), can be used in a variety of latex coating compositions, including paint, caulking, sealing, mastic, and ink compositions. Such compositions generally comprise latex that includes water and an emulsion of a polymeric binder effective to perform the desired function (i.e., painting, caulking, sealing, adhesion, or binding ink pigments) the ketal adduct (1), specifically (1a), and optionally other components effective to perform the desired function of the composition. Thus, in an embodiment, a latex coating composition comprises a latex polymer binder, water, a ketal adduct (1), specifically (1a), and an additive.

The polymer binder of the latex can be selected from a wide variety of polymers as known in the art of latex coating compositions, for example those described above for latex paint compositions. For instance, the latex polymer binder can be derived from monomers comprising at least one acrylic monomer such as acrylic acid, acrylic acid C1-10 alkyl esters, methacrylic acid, or methacrylic acid C1-10 alkyl esters, optionally copolymerized with one or more of styrene, hydroxyethyl acrylate, hydroxypropyl acrylate, α-methyl styrene, vinyl chloride, acrylonitrile, methacrylonitrile, ureido methacrylate, vinyl acetate, vinyl esters of branched tertiary monocarboxylic acids (e.g., vinyl esters of versatic acid commercially available under the trademark VeoVa® from Shell Chemical Company or the trademark Exxar® Neo Vinyl Esters from ExxonMobil Chemical Company), itaconic acid, crotonic acid, maleic acid, fumaric acid, and ethylene. It is also possible to include C4-8 conjugated dienes such as 1,3-butadiene, isoprene, and chloroprene. In an embodiment, the monomers include one or more of n-butyl acrylate, methyl methacrylate, styrene, and 2-ethylhexyl acrylate.

Pure acrylics can be used (comprising acrylic acid, methacrylic acid, an acrylate ester, and/or a methacrylate ester); styrene-acrylics (comprising styrene and acrylic acid, methacrylic acid, an acrylate ester, and/or a methacrylate ester); vinyl-acrylics (comprising vinyl acetate and acrylic acid, methacrylic acid, an acrylate ester, and/or a methacrylate ester); acrylated ethylene vinyl acetate copolymers (comprising ethylene, vinyl acetate and acrylic acid, methacrylic acid, an acrylate ester, and/or a methacrylate ester), and acrylamide and acrylonitrile, optionally together with monomers such as itaconic acid and ureido methacrylate.

The latex polymer binder is present in water in the form of an aqueous emulsion, and can include about 2 to about 75 weight percent (wt. %) solids, specifically about 5 to about 70 wt. % solids (i.e., the weight percentage of the dry polymer latex based on the total weight of the aqueous latex coating composition). The latex can be present in a wide variety of particle sizes, for example a mean latex particle size from about 10 to about 1,000 nanometers (nm), specifically about 50 to about 800 nm. The particle size distribution can be mono-modal or multimodal, for example bimodal. The ketal adduct (1), specifically (1a), is present in the latex coating composition in an amount effective for its purpose, i.e., coalescence of a coating, solubilization, and the like. Such amounts can be determined by one of ordinary skill in the art, and can be for example, from about 0.1 to about 30 wt. %, specifically about 0.5 to about 20 wt. %, based on the total weight of the latex coating compositions. The balance of the latex coating compositions is water and other optional additives known in the art.

In a specific embodiment, the ketal adducts (1), specifically (1a), are used in latex paint compositions, and can reduce or replace other organic solvents in the latex paint compositions. EtLPK in particular can be used as a green/non-toxic coalescing solvent in latex paint compositions, and in particular paints used in architectural and light industrial applications. More efficient coalescing, specifically, lower quantities of the ketal adduct can generally be used to obtain a particular minimum film formation temperature. In addition it has been observed that the latex paint compositions containing the ketal adducts can have a less objectionable odor as compared to latex paint compositions formulated with commonly used organic solvents.

Thus, in one embodiment, a latex paint composition comprises a latex polymer binder, often two or more polymer binders, water, a ketal adduct (1), specifically (1a), and optionally a pigment.

A wide variety of latex polymer binders can be used, including those described above. Acrylics can be used, formed from one or more of acrylic acid, methacrylic acid, C1-10 alkyl acrylate ester, or C1-10alkyl methacrylate ester monomers. Styrene-acrylics formed from styrene and at least one of acrylic acid, methacrylic acid, C1-10 alkyl acrylate ester, or C1-1-alkyl methacrylate ester monomers can be used. Other latexes include vinyl-acrylics formed from vinyl acetate and at least one of acrylic acid, methacrylic acid, C1-10 alkyl acrylate ester, or C1-10 alkyl methacrylate ester monomers. Acrylated ethylene-vinyl acetate copolymers can be used, formed from ethylene, vinyl acetate, and at least one of acrylic acid, C1-10 alkyl acrylate ester, or C1-10 alkyl methacrylate ester monomers. The foregoing polymers can also include other monomers such as acrylamide, acrylonitrile, itaconic acid, and ureido methacrylate. Urethane acrylates can also be used, formed from an acrylic emulsion made in the presence of a polyurethane dispersion.

A pigment can be present in the latex paint composition. The term "pigment" as used herein includes non-film-forming solids such as extenders and fillers, for example an inorganic pigment $TiO_2$ (in both anastase and rutile forms), clay (aluminum silicate), $CaCO_3$ (in both ground and precipitated forms), aluminum oxide, silicon dioxide, magnesium oxide, talc (magnesium silicate), barites (barium sulfate), zinc oxide, zinc sulfite, sodium oxide, potassium oxide, solid (high Tg) organic latex particles added to modify hardness or surface roughness or (as in the case of hollow latex particles) to replace $TiO_2$, and a combination comprising at least one of the foregoing. Representative combinations include blends of metal oxides such as those sold under the marks Minex® (oxides of silicon, aluminum, sodium and potassium commercially available from Unimin Specialty Minerals), Celites® (aluminum oxide and silicon dioxide commercially available from Celite Company), Atomites® (commercially available from English China Clay International), and Attagels® (commercially available from Engelhard). Specifically, the pigment includes $TiO_2$, $CaCO_3$, or clay.

Generally, the mean particle sizes of the pigments are about 0.01 to about 50 micrometers. For example, the $TiO_2$ particles used in the aqueous coating composition typically have a mean particle size from about 0.15 to about 0.40 micrometers. The pigment can be added to the aqueous coating composition as a powder or in slurry form.

The latex paint composition can contain additional additives, as known in the art, to modify the characteristics of the latex paint composition, provided that the additives do not significantly adversely affect the desired properties of the paint. These additives can include a plasticizer, drying retarder, dispersant, surfactant or wetting agent, rheology modifier, defoamer, thickener, biocide, mildewcide, colorant, wax, perfume, pH adjuster, or co-solvent. The additives are present in the amount ordinarily used in latex paint compositions. In an embodiment, the latex paint composition consists essentially of a latex polymer binder, water, an optional pigment, and a ketal adduct (1), specifically (1a). As used herein, the phrase "consists essentially of" encompasses the latex polymer binder, water, optional pigment, and ketal adduct, and optionally one or more of the additives defined herein, but excluding any additive that significantly adversely affects the desired properties of the latex paint composition or the dried coating derived therefrom.

The latex polymer binder can be present in the latex paint composition in a dry weight amount from about 5 to about 80 wt. %, and more specifically about 8 to about 60 wt. % of the latex paint composition When present, a pigment can be used in the latex paint composition in an amount from about 5 to about 75 wt. %, specifically about 10 to about 55 wt. % of the total solids in the latex paint composition.

The ketal adduct (1), specifically 1(a), can be present in the latex paint composition in an amount from about 0.1 to about 30%, more specifically about 0.5 to about 20 wt. %, more specifically about 1 to about 15 wt. %, 1 to about 10 wt. %, more specifically about 1 to about 8 wt. %, and still more specifically about 1 to about 7 wt. %, based on the total weight of the latex paint composition.

Although much of the water in the latex paint is provided by the latex emulsion and in other components of the latex paint composition, water can be added separately to the latex paint composition during formulation thereof. Typically after formulation is completed, the latex paint composition includes about 10 to about 85 wt. % and more specifically about 20 to about 80 wt. % water, i.e., the total solids content of the latex paint composition is about 15 to about 90 wt. %, more specifically, about 20 to about 80 wt. % of the total composition. The compositions are typically formulated such that the hardened (dried) coatings comprise at least 5 volume % (vol. %) dry polymer solids and 5 to 90 vol. % of non-polymeric solids in the form of pigments.

In another embodiment, a latex caulking composition comprises a latex polymer binder, water, a ketal adduct (1), specifically (1a), and a caulking additive, for example fillers, such as talc and calcium carbonate, mildewcides, biocides, pigments and plasticizers. The polymer binder of the caulking composition can be selected from a wide variety of polymers as known in the art of latex coating compositions, for example those described above for latex paint compositions. Additives include fillers, such as talc and calcium carbonate, mildewcides, biocides, antifoam agents, antifreeze agents, pigments and plasticizers. The amounts of the latex polymer binder and the ketal adduct (1), specifically 1(a) effective to form a latex caulking composition can be determined by one of ordinary skill in the art, and can be, for example, about 5 to about 80 wt. % of the polymer binder solids, based on the total weight of the latex caulking composition, and about 0.1 to about 30% of the ketal adduct, more specifically between about 0.1 and 10% (1), specifically 1(a), based on the total weight of the latex caulking composition.

In another embodiment, a latex sealant, mastic, or adhesive composition comprises a latex polymer binder, water, a ketal adduct (1), specifically (1a), and a sealant or adhesive additive, for example a pigment. The polymer binder of the sealant or adhesive can be selected from a wide variety of polymers as known in the art of latex coating compositions, for example those described above for latex paint compositions. Additives include fillers, such as talc and calcium carbonate, mildewcides, biocides, pigments, antifoam agents, antifreeze agents, tackifiers, and plasticizers. The amounts of the latex polymer binder and the ketal adduct (1), specifically 1(a) effective to form a latex sealing or adhesive composition can be determined by one of ordinary skill in the art, and can be, for example, about 5 to about 80 wt. % of the polymer binder solids, based on the dry weight of the caulking composition, and about 0.1 to about 30%, specifically about 0.1 to about 10% and more specifically about 0.1 to about 5% of the ketal adduct (1), specifically 1(a), based on the total weight of the sealant, mastic, or adhesive composition.

In another embodiment, a latex ink composition comprises a latex polymer binder, water, a ketal adduct (1), specifically (1a), a pigment and optionally an ink additive, for example a wax. The polymer binder of the latex can be selected from a wide variety of polymers as known in the art of latex ink compositions, for example those described above for latex paint compositions. Additives include waxes, dyes, antifoam agents, antifreeze agents, surfactants, and plasticizers. The amounts of the latex polymer binder and the ketal adduct (1), specifically 1(a) effective to form a latex ink composition can be determined by one of ordinary skill in the art, and can be, for example, about 5 to about 80 wt. % of the polymer binder solids, based on the dry weight of the ink composition, and about 0.1 to about 30% of the ketal adduct (1), specifically 1(a), based on the total weight of the latex ink compositions.

A method of preparing a latex coating composition, for example a paint composition, comprises combining the aqueous emulsion of the latex polymer binder, the ketal adducts (1), specifically (1a), and any optional additives, for example a pigment to form a latex coating composition. The ketal adducts and additives can be added in any suitable order to the polymer latex, the additives, or combinations thereof, to provide these additives in the aqueous coating composition. In the case of latex paint compositions, the aqueous coating composition has a pH from 7 to 10.

A method of use, that is, coating a substrate with the latex coating composition is also described. The substrate can be a wide variety of materials such as paper, wood, concrete, metal, glass, ceramics, plastics, plaster, roofing substrates such as asphaltic coatings, roofing felts, foamed polyurethane insulation, polymer roof membranes, and masonry substrates such as brick, cinderblock, and cementitious layers, including exterior building cladding systems such as EIFS (Exterior Insulating Finishing Systems). The substrates include previously painted, primed, undercoated, worn, or weathered substrates. The method comprises contacting a surface of the substrate with the latex coating composition to form a coating; and drying the coating to harden the coating. The term "coating" as used herein broadly encompasses a thin film (e.g., a layer having a thickness of 0.02 to 5 millimeters, as would be formed using a paint or ink formulation) and thicker layers, for example thick bead of material (e.g., a bead having a thickness of 5 to 50 millimeters or more, as would be formed using a caulking or material). The term "coating" further includes continuous as well as patterned layers. The aqueous coating composition can be applied to the materials by a variety of techniques well known in the art such as, for example, curtain coating, sponge, brush, roller, mop, air-assisted or airless spray, electrostatic spray, caulking gun, ink jet, and the like. Hardening occurs through solvent loss, either by evaporation under atmospheric conditions at room temperature or with heat to aid drying rate.

According to another embodiment, a substrate coated with a dried latex coating is provided, wherein the dried latex coating comprises the latex polymer binder in the form of a dried coating. Trace amounts of a ketal adduct (1), specifically (1a) may be present. The dried latex coating is disposed on a surface of the substrate, in the form of a layer that can partially or completely cover the surface. The coating can be disposed directly on the surface, or one or more intermediate layers (e.g., a primer) can be present between the coating and the surface of the substrate. In a further embodiment, the dried latex coating can be a dried latex paint coating that comprises the latex polymer binder in the form of a layer. The dried latex paint coating further contains one or more additional additives as discussed above, for example a pigment. The dried latex coating or dried latex paint coating can be substantially free of one or more of water, another coalescing agent, or other organic solvent. In a specific embodiment, no residual ketal adduct (1) or (1a) is present in the dried layer; in another embodiment any residual amount of ketal adduct (1) or (1a) is present in the dried layer in an amount that does not adversely affect the properties of the coating, for example the hardness of the coating.

The latex coating compositions exhibit comparable or improved coalescence compared to otherwise similar compositions that do not have the ketal adducts (1), specifically (1a).

Furthermore, the latex paint compositions can have very good overall performance, in particular one or more of Viscosity, Dry Times, Sag Resistance, Flow and Leveling, Hardness, Specular Gloss, Dry Film Adhesion, Impact Flexibility, Dilute Alkali Resistance, Water Resistance, Stain Resistance, Solvent Resistance, Hydraulic Fluid Resistance, Weatherability, and good heat storage stability.

In a specific embodiment, a latex paint composition comprises a styrene-acrylic emulsion, water, pigment, and EtLPK. Styrene-acrylic emulsions are particularly suited for light industrial interior/exterior enamels and as a primer. These compositions exhibit very good overall performance, in particular Viscosity, Dry Times, Sag Resistance, Flow and Leveling Hardness, Specular Gloss, Dry Film Adhesion, Impact Flexibility, Dilute Alkali Resistance, Water Resistance, Stain Resistance, Solvent Resistance, Hydraulic Fluid Resistance, and Weatherability. The compositions had acceptable resistance to long-term exposures such as salt spray and acceptable corrosion resistance, for most applications.

In another specific embodiment, a latex paint composition comprises a 100% acrylic emulsion, water, pigment, and EtLPK. Acrylic emulsions of this type are particularly suited for wall paints and interior/exterior architectural trim paints. These compositions possess excellent Viscosity, Dry Times, Flow and Leveling, Hardness, Dry Film Adhesion, Impact Flexibility, Dilute Alkali Resistance, Dilute Acid Resistance, Water Resistance, Stain Resistance, superior Dry through, Specular Gloss, and Sag Resistance properties, particularly compared to compositions using a TPM coalescing agent. These compositions possess acceptable scrub resistance for most applications.

In another specific embodiment, a latex paint composition comprises a polyvinyl acetate emulsion, water, pigment, and EtLPK. Polyvinyl acetate emulsions of this type are especially suited for use as interior wall paints. On primed drywall, these compositions exhibit very good Viscosity, Dry Times (Set-to-Touch, Surface Dry, and Dry Through), Flow and Leveling, Hardness, Specular Gloss, Dilute Acid Resistance, Dilute Alkali Resistance, Water Resistance, Stain Resistance. The compositions had acceptable scrub resistance for most applications.

The following non-limiting examples further illustrate various embodiments of the invention.

EXAMPLES

Example 1

EtLPK is characterized and compared with various solvents in this example.

Solubility studies with polymers show the solvating effectiveness of the ketal adducts (1), specifically (1a). In these experiments, solubility observations were made after 0.5 g resin and 4.5 g solvent were agitated for 24 hours at room temperature. Solubility ratings ranged from 1 (complete solubility) to 6 (no effect) based on visual observations.

TABLE 1

|  | EGBE | DPM | PMA | DBE | DL | SME | EtLPK |
|---|---|---|---|---|---|---|---|
| Paraloid B-72 | 1 | 1 | 1 | 1 | 4 | 5 | 1 |
| Paraloid B-82 | 1 | 1 | 1 | 1 | 3 | 6 | 1 |
| Desmocoll 176 | 4 | 4 | 1 | 2 | 5 | 4 | 2 |
| Desmocoll 406 | 3 | 2 | 1 | 1 | 4 | 5 | 2 |
| CAP-482-0.5 | 2 | 2 | 1 | 1 | 6 | 6 | 1 |
| D.E.R.661 | 1 | 1 | 1 | 1 | 5 | 5 | 1 |
| EPON 1001F | 1 | 1 | 1 | 1 | 5 | 3 | 1 |
| PKHH | 1 | 1 | 2 | 1 | 6 | 6 | 1 |

TABLE 1-continued

|  | EGBE | DPM | PMA | DBE | DL | SME | EtLPK |
|---|---|---|---|---|---|---|---|
| Butvar B-76 | 1 | 1 | 1 | 1 | 4 | 4 | 2 |
| Polyvinyl Acetate | 3 | 1 | 1 | 1 | 6 | 6 | 1 |

Ethylene glycol butyl ether (EGBE), Dipropylene glycol methyl ether (DPM), Propylene glycol methyl ether acetate (PMA), dibasic esters (DBE), d-Limonene (DL), Soy methyl esters (SME), and Ethyl levulinate propylene glycol ether (EtLPK).
Solubility was based on visual observation of the solvent-polymer mixture using the following rating scheme: 1 = completely soluble, 2 = almost soluble, 3 = strongly swollen/slightly soluble, 4 = swollen, 5 = little swelling, 6 = no visible effect.
Resins tested were thermoplastic acrylics Paraloid B-72 and B-82 (Rohm and Haas Company), flexible polyurethanes Desmocoll 176 and 406 (Bayer Material Science LLC), cellulose acetate propionate CAP-482-0.5 (Eastman Chemical Company), solid epoxies D.E.R. 661 (The Dow Chemical Company) and EPON 1001F (Momentive Specialty Chemicals Inc.), phenoxy PKHH (InChem Corporation), polyvinyl butyral Butvar B-76 (Solutia, Inc.), and polyvinyl acetate (Sigma-Aldrich Corporation).

The data in Table 1 show that EtLPK dissolves a variety of common polymers, with performance similar to petroleum-based solvents ethylene glycol butyl ether (EGBE), dipropylene glycol methyl ether (DPM), propylene glycol methyl ether acetate (PMA), and dibasic esters (DBE). EtLPK significantly outperformed the bio-sourced solvents soy methyl esters (SME) and d-limonene (DL) in their ability to dissolve common polymers.

Example 2

Comparative

"EtLGK" is ethyl levulinate glycerol ketal, having the formula

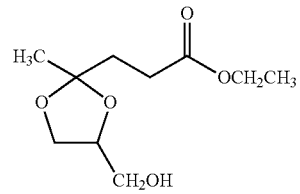

EtLGK was evaluated as a coalescing solvent for water-based acrylic coatings. The acrylic emulsion selected was Maincote PR-71 (Dow), an acrylic with a Tg of 25° C. A combination of EGBE as the coalescent and dibutyl phthalate (DBP) as a plasticizer was recommended by the manufacturer. This combination was utilized at a coalescent level of 15.2% and 3.1% plasticizer, based on emulsion solids, to serve as a standard for comparison. EtLGK was used as a replacement for both the EGBE coalescent and the DBP on an equal weight basis. The resulting blends had the compositions shown in Table 2.

TABLE 2

|  | Parts by Weight | |
|---|---|---|
|  | A | B |
| Material |  |  |
| Maincote PR-71 | 100.0 | 100.0 |
| Colloid 643 Defoamer | 0.8 | 0.8 |
| EGBE | 7.6 | — |
| Dibutyl Phthalate | 1.5 | — |
| EtLGK | — | 9.1 |
| TOTALS | 109.9 | 109.9 |
| Properties |  |  |
| Viscosity (cps) | 695 | 630 |
| Film Appearance | Excellent | Slight Cratering |

TABLE 2-continued

| | Parts by Weight | |
|---|---|---|
| | A | B |
| Hardness - 24 hours | 4B | >6B (tack) |
| Hardness - 7 days | B | 5B (tack) |

The results in Table 2 show that EtLGK as a replacement for both the coalescing agent and the plasticizer (Sample B) resulted in good film coalescence, but all such films remained relatively soft and tacky as compared to the Standard (A).

Example 3

Performance experiments in films utilized Rhoplex SG-10M (Rohm and Haas Corporation), an emulsion of a methyl methacrylate/n-butyl acrylate copolymer. Use of 6-10% TPM is recommended as a coalescent. Direct comparison of EtLPK to TPM and EGBE was carried out by drawing 2 mil films on steel and aluminum plates.

TABLE 3

| | Parts by Weight | | |
|---|---|---|---|
| | (C) | (D) | (E) |
| Material | | | |
| Rhoplex SG-10M | 100.0 | 100.0 | 100.0 |
| Rhodoline 643 | 2.0 | 2.0 | 2.0 |
| TPM | 10.0 | — | — |
| EtLPK | — | 10.0 | — |
| EGBE | — | — | 10.0 |
| TOTALS | 112.0 | 112.0 | 112.0 |
| Properties | | | |
| Viscosity (100 rpm, 23° C.) (cP) | 207.0 | 155.8 | 121.6 |
| Film Pencil Hardness, Steel, 24 hrs | F | F | F |
| Film Pencil Hardness, Al, 24 hrs | F | H | F |
| Film Pencil Hardness, Steel, 7 days | HB | F | H |
| Film Pencil Hardness, Al, 7 days | F | F | H |

TPM, EGBE, and EtLPK all produced good films that were tack-free after 24 hours of drying in ambient conditions at 10 parts per hundred of latex (phr) loading.

Film properties were essentially equivalent, although EtLPK-based films (D) were slightly harder than TPM-based films (C); EGBE-based films (E) showed highest hardness. The EtLPK formulation showed viscosity between the TPM and EGBE formulations. Varying the shear profile of the viscometer showed very similar shear thinning for all three samples, as shown in the FIGURE, which shows viscosity vs. log spindle rpm (shear rate) for TPM, EGBE, and EtLPK.

Example 4

In order to better understand the plasticization efficiency of EtLPK in comparison to TPM and EGBE, dynamic mechanical analysis (DMA) was carried out on poly(methyl methacrylate) (PMMA) compounded with 10% and 33% coalescing solvent. Results are shown in Table 6.

TABLE 4

| Sample | Tg (° C.) (by Tan δ) | Tg (° C.) (by E") |
|---|---|---|
| PMMA neat | 142.0 | 131.2 |
| 10% TPM in PMMA | 109.0 | 94.2 |
| 10% EGBE in PMMA | 107.7 | 95.0 |

TABLE 4-continued

| Sample | Tg (° C.) (by Tan δ) | Tg (° C.) (by E") |
|---|---|---|
| 10% EtLPK in PMMA | 101.8 | 86.5 |
| 33% TPM in PMMA | 59.8 | 46.0 |
| 33% EGBE in PMMA | 111.6 | 97.3 |
| 33% EtLPK in PMMA | 58.2 | 48.8 |

At 10% levels, EtLPK-compounded PMMA showed significantly lower $T_g$ than TPM-plasticized and EGBE-plasticized PMMA by both peak tan delta and E" methods. Therefore, it can be concluded that EtLPK is a more efficient plasticizer than TPM and EGBE, at least in this concentration domain. At higher coalescent loadings of 33%, the differentiation in performance between EtLPK and TPM has disappeared, while EGBE continues to show inferior performance.

Example 5

Efficiency of latex coalescence was determined by Minimum Film Formation Temperature (MFFT) using a Rhopoint MFFT bar in accordance with ASTM D2354. Performance of EtLPK and isopropyl levulinate propylene glycol ketal (iPrLPK) was compared to TMP in three different latexes: vinyl-acrylic latex UCAR 379G (Arkema, Inc.), acrylic latex UCAR 625 (Arkema, Inc.), and acrylic latex Maincote 54D (Rohm and Haas Corporation). EtLPK, iPrLPK, and TPM were compared at both 1.0 phr and 2.0 phr of latex loadings for UCAR 379G and UCAR 625, and at 3.0 phr and 6.0 phr for Maincote 54D. Defoamer Rhodoline 643 was added to each formulation at 0.2 phr of latex. MFFT of a control formulation of pure latex with no additives was also measured for each latex.

TABLE 5

| | Loading (phr) | UCAR 379G (Vinyl acrylic) MFFT (° C.) | UCAR 625 (Acrylic) MFFT (° C.) | Maincote 54D (Acrylic) MFFT (° C.) |
|---|---|---|---|---|
| control | 0 | 12.0 | 12.2 | >33 |
| TPM | 1.0 | 6.0 | 5.2 | 13.6 |
| TPM | 2.0 | 2.8 | 2.3 | 2.8 |
| EtLPK | 1.0 | 4.4 | 4.3 | 10.8 |
| EtLPK | 2.0 | 1.6 | 0.9 | 0.0 |
| iPrLPK | 1.0 | 5.1 | 4.1 | 11.0 |
| iPrLPK | 2.0 | 2.2 | 0.9 | 1.2 |

MFFT measurements revealed that both EtLPK and isopropyl levulinate propylene glycol ketal (iPrLPK) are more efficient coalescents that TMP in the three latexes tested (Table 5).

Example 6

EtLPK was investigated as a green/non-toxic coalescing agent for use with a paint based on an aqueous acrylic emulsion, in particular a paint useful in light industrial exterior/interior applications. The EtLPK was used as a pound for pound replacement for TPM.

The base formulation was a gloss white enamel based on Rohm & Haas' Maincote HG-56, which is 50% non-volatile (NV) acrylic emulsion supplied in water designed for use in light industrial applications such as walls and floors, stair wells, hand rails, exterior tank coatings, equipment, and the like. A 15.0 wt. % coalescent level (based on the weight of Maincote HG-56 solids) was used for evaluation of both TPM ("F") and EtLPK ("G").

Formulation details and coating constants for each formulation are shown in Table 6. The components of the basic grind were combined, and then subjected to a high speed dispersion to a texture of greater than 7 on the National Standard scale (7+ N.S.), then the let-down was added.

TABLE 6

| Material | F* Pounds | F* Gallons | G Pounds | G Gallons |
|---|---|---|---|---|
| Grind Base | | | | |
| De-Ionized Water | 35.0 | 4.20 | 35.0 | 4.20 |
| Glycol Ether DPM | 18.0 | 2.28 | 18.0 | 2.28 |
| Tamol 165 | 9.5 | 1.08 | 9.5 | 1.08 |
| Ammonium Hydroxide (28%) | 1.0 | 0.13 | 1.0 | 0.13 |
| Triton CF-10 | 1.5 | 0.17 | 1.5 | 0.17 |
| Tego Foamex 1488 | 1.5 | 0.18 | 1.5 | 0.18 |
| Ti-Pure R-706 | 195.0 | 5.85 | 195.0 | 5.85 |
| De-Ionized Water | 25.0 | 3.00 | 25.0 | 3.00 |
| Total | 286.5 | 16.89 | 286.5 | 16.89 |
| Letdown | | | | |
| Maincote HG-56 | 523.0 | 61.71 | 523.0 | 61.71 |
| Ammonium Hydroxide (28%) | 4.0 | 0.52 | 4.0 | 0.52 |
| TPM | 39.2 | 4.96 | — | — |
| EtLPK | — | — | 39.2 | 4.59 |
| De-Ionized Water | 65.0 | 7.80 | 65.0 | 7.80 |
| Tego Foamex 1488 | 2.5 | 0.30 | 2.5 | 0.30 |
| 15% Aqueous Sodium Nitrite Solution | 9.0 | 1.08 | 9.0 | 1.08 |
| Acrysol RM-8W | 3.0 | 0.35 | 3.0 | 0.35 |
| Total | 932.2 | 93.61 | 932.2 | 93.24 |

| Typical Coating Constants | Amount | |
|---|---|---|
| Total Weight Solids | 49.7% | 49.7% |
| Total Volume Solids | 39.2% | 39.3% |
| PVC | 16.0% | 16.0% |
| VOC | | |
| Pounds per Gallon | 0.89 | 0.89 |
| Grams per Liter | 106.38 | 106.95 |
| Viscosity | 65 K.U. | 68 K.U. |

*Comparative

All paint films for testing were applied to bare, cold rolled steel to a dry film thickness of 2.0-2.5 mils (51-64 micrometers) application using a Bird Bar Applicator. All applied films were then allowed to dry for a period of 14 days prior to any destructive testing.

The samples were tested for the physical properties, chemical, detergent, and stain resistance properties, and accelerated properties shown in Table 7. The physical properties of the films are shown in Table 8.

TABLE 7

| Physical Properties | Test Method (s) |
|---|---|
| Viscosity - Stormer (K.U.) | ASTM D562 |
| Freeze Thaw Stability | ASTM D2243 |
| Dry Times | ASTM D1640 (circular recorder) |
| Film Hardness | ASTM D3363 |
| Specular Gloss | ASTM D523 |
| Adhesion | ASTM D3359 |
| Flexibility | ASTM D2794 |
| Chemical Resistance | Test Method (s) |
| Dilute acid | ASTM D1308 (sec. 6.2) |
| Alkali solutions | ASTM D1308 (sec. 6.2) |
| De-ionized Water | ASTM D1308 (sec. 6.2) |
| Solvent and Fluid | ASTM D1308 (sec. 6.2) |
| Stain producing products | ASTM D1308 (sec. 6.2) |
| Application Properties | Test Method (s) |
| Sag Resistance | ASTM D |
| Flow and Leveling | ASTM D2801 |
| Accelerated Exposures | Test Method (s) |
| QCT Condensing Humidity Resistance | ASTM D4585 |
| UV Durability/Weathering Resistance | ASTM G53 |

TABLE 8

| Property | F (TPM) | G (EtLPK) |
|---|---|---|
| Dry Times (Room temperature) | | |
| Set-to-Touch | 1.0 hrs. | 1.0 hrs. |
| Surface Dry | 1.4 hrs. | 1.6 hrs. |
| Dry Through | 8.0 hrs. | 7.8 hrs. |
| Leneta Sag Resistance | 7 | 6 |
| Flow and Leveling | 5 | 5 |
| Hardness Development | | |
| 24 hours | <6B | <6B |
| 48 hours | 6B | 6B |
| 7 days | 5B | 4B |
| 2 weeks | 4B | 2B |
| 4 weeks | B | B |
| Specular Gloss | | |
| 60 Degree | 59.0 | 60.6 |
| 20 Degree | 15.5 | 18.2 |
| Dry Film Adhesion | 5B | 5B |
| Impact Flexibility (In/Lbs) | | |
| Direct | 160 | 160 |
| Reverse | 160 | 160 |

The chemical and stain resistance properties of the films are shown in Table 9. The test method used was the ASTM D-1308 (sec. 2)—covered spot test. Exposure to each reagent was for 18 hours.

TABLE 9

| Reagent | F (TPM) | G (EtLPK) |
|---|---|---|
| Chemical Reagent | | |
| 5% Acetic Acid | Mod. LOG | Mod. LOG |
| | 4MD Blisters | 4-6MD Blisters |
| 10% Hydrochloric Acid | Softens to 5B | Softens to 5B |
| | No Blistering | 4-8F Blisters |
| 10% Sulfuric Acid | Softens to 5B | Softens to 4B |
| | No Blistering | 4-8F Blisters |
| 10% Nitric Acid | Softens to 5B | Softens to 2B |
| | 8D Blisters | 4-8D Blisters |
| 10% Ammonium Hydroxide | Softens to <6B | Softens to <6B |
| | Slight Swelling | No Swelling |
| 10% Sodium Hydroxide | Softens to <6B | Softens to 4B |
| | No Blistering | 4-8F Blisters |
| De-Ionized Water | N.E. | N.E. |
| Staining Reagent | | |
| Grape Juice | N.E. | N.E. |
| Red Wine | N.E. | N.E. |
| Merthiolate | Severe Stain | Severe Stain |
| Ketchup | N.E. | N.E. |
| Mustard | Very slight Stain | Very slight Stain |

The solvent and fluid resistance properties of the films are shown in Table 10. The test method used was the ASTM D-1308 (sec. 2)—covered spot test. Exposure time was for four hours at room temperature.

TABLE 10

| Reagent | F (TPM) | G (EtLPK) |
|---|---|---|
| Anti-Freeze | Softens to 4B | Softens to 2B |
| Gasoline | Softens to <6B | Softens to <6B |
| Brake Fluid | Dissolves Film | Dissolves Film |
| Skydrol 500B-4 | Dissolves Film | Dissolves Film |
| Skydrol LD | Dissolves Film | Dissolves Film |
| MEK Double Rubs | 50 - softens to <6B Slight removal | 50 - softens to <6B Slight Removal |
| Xylene Double Rubs | 50 - softens to <6B | 50 - softens to <6B |
| Isopropanol Double Rubs | 50 - softens to 2B | 50 - no softening |

The condensing and humidity resistance of the films are shown in Table 11. The test method used was the ASTM D4585. Exposure time was for 1,000 hours.

TABLE 11

| Property | | F (TPM) | G (EtLPK) |
|---|---|---|---|
| Specular Gloss | | | |
| 60 Degree | Initial | 59.1 | 60.7 |
| | 500 hrs. | 10.0 | 11.2 |
| 20 Degree | Initial | 15.7 | 18.3 |
| | 500 hrs. | 1.9 | 2.1 |
| Yellowing | | None | None |
| Blistering | | #10 Medium Dense | #10 Dense |

The QUV accelerated weathering resistance of the films is shown in Table 12. The test method used was the ASTM G53. Exposure time was for 500 hours.

TABLE 12

| Property | | F (TPM) | G (EtLPK) |
|---|---|---|---|
| Specular Gloss | | | |
| 60 Degree | Initial | 59.6 | 60.4 |
| | 500 hrs. | 11.7 | 11.3 |
| 20 Degree | Initial | 15.4 | 17.9 |
| | 500 hrs. | 1.9 | 1.9 |
| Yellowing | | None | None |
| Blistering | | #10 Medium Dense | #10 Dense |

The salt spray resistance of the films is shown in Table 13. The test method used was the ASTM B117. Exposure time was for 100 hours, 144 hours, and 336 hours as shown.

TABLE 13

| Property | F (TPM) | G (EtLPK) |
|---|---|---|
| 100 Hours Exposure | | |
| Field | No Effect | #8 Few Blisters |
| Scribe | #10 Few Blisters | #8 Med. Blisters |
| Rust | Very Slight | Very Slight |
| 144 Hours Exposure | | |
| Field | #8 Few Blisters | #6-8 Dense Blisters |
| Scribe | #8 Few Blisters | #6 Medium Blisters |
| Rust | Slight | Slight |
| 336 Hours Exposure | | |
| Field | #4-8 Med. Few Blisters | — |
| Scribe | #4-8 Few Blisters | — |
| Rust | Moderate | — |

The above results show that EtLPK, when used as a coalescing agent in acrylic emulsion Maincote HG 56, exhibits very good overall performance. With respect to the measured performance properties, most (Viscosity, Dry Times, Sag Resistance, Flow and Leveling Hardness, Specular Gloss, Dry Film Adhesion, Impact Flexibility, Dilute Alkali Resistance, Water Resistance, Stain Resistance, Solvent Resistance, Hydraulic Fluid Resistance, and Weatherability) are equal or superior to TPM. The only exceptions were in Dilute Acid Resistance, Humidity Resistance, and Salt Spray Resistance, which were acceptable overall, but inferior to TPM.

Example 7

EtLPK was investigated as a green/non-toxic coalescing agent for use in a paint based on an aqueous 100% acrylic aqueous emulsion, in particular a paint useful in architectural and light industrial applications. The EtLPK was used as a pound for pound replacement for TPM.

The base formulation was a semi-gloss trim paint based on Dow/Rohm & Haas' Rhoplex AC-264, which is 100% acrylic emulsion at 60% non-volatile (NV) in water. A 5.02% wt. % coalescent level (based on the weight of Rhoplex AC-264 solids) was used for evaluation of both TPM ("H") and EtLPK ("I").

Formulation details and typical coating constants for each formulation are shown in Table 14. The components of the basic grind were mixed well, the $TiO_2$ and silicate was added, and then the mixture subjected to a high-speed dispersion to a texture of 7+ N.S., then the let-down was added under agitation.

TABLE 14

| | H* | | I | |
|---|---|---|---|---|
| Material | Pounds | Gallons | Pounds | Gallons |
| Grind Base | | | | |
| De-Ionized Water | 43.1 | 5.17 | 43.1 | 5.17 |
| Propylene Glycol | 40.0 | 4.62 | 40.0 | 4.62 |
| Coloid 643 Defoamer | 2.0 | 0.26 | 2.0 | 0.26 |
| Tamol 731A | 10.0 | 1.09 | 10.0 | 1.09 |
| Triton CF-10 | 2.0 | 0.23 | 2.0 | 0.23 |
| Dimethylaminoethanol | 2.0 | 0.27 | 2.0 | 0.27 |
| Ti-Pure R-960 Rutile Titanium Dioxide | 250.0 | 7.32 | 250.0 | 7.32 |
| Burgess No. 98 Aluminum Silicate | 60.0 | 2.79 | 60.0 | 2.79 |
| Letdown | | | | |
| Rhoplex AC-264 100% Acrylic Emulsion | 465.0 | 52.54 | 465.0 | 52.54 |
| Colloid 643 Defoamer | 6.0 | 0.78 | 6.0 | 0.78 |
| Propylene Glycol | 35.0 | 4.04 | 35.0 | 4.04 |
| TPM | 14.0 | 1.77 | | |
| EtLPK | | | 14.0 | 1.64 |
| 2% Natrosol 250 MHR Solution | 159.3 | 19.12 | 159.3 | 19.12 |
| Total | 1088.4 | 100.00 | 1088.4 | 99.87 |
| Typical Coating Constants | Amount | | Amount | |
| Total Weight Solids | 55.7% | | 55.7% | |
| Total Volume Solids | 42.2% | | 42.3% | |
| PVC | 24.7% | | 24.7% | |
| VOC | | | | |
| Pounds per Gallon | 1.68 | | 1.68 | |
| Grams per Liter | 202 | | 202 | |
| pH | 8.25 | | 8.02 | |
| Freeze-Thaw Resistance | 4 cycles | | 4 cycles | |
| Viscosity | | | | |
| Stormer (Kreb Units) | 91 | | 91 | |
| ICI Cone & Plate (#2 spindle, 900 rpm) | 1.290 | | 1.237 | |
| Brookfield (cps) | | | | |
| 10 rpm | 5900 | | 6860 | |
| 20 rpm | 4050 | | 4703 | |

TABLE 14-continued

| | | |
|---|---|---|
| 50 rpm | 2500 | 2768 |
| 100 rpm | 1676 | 1980 |

*Comparative

All paint films for testing were applied to iron phosphate-treated, cold rolled steel to a dry film thickness of 2.0-2.5 mils (51-64 micrometers) via brush and roll application. All applied films were then allowed to dry for a period of 14 days prior to any destructive testing.

The samples were tested for the physical properties, chemical, detergent, and stain resistance properties, and accelerated properties shown in Table 15.

TABLE 15

| Physical Properties | Test Method (s) |
|---|---|
| Viscosity | |
| Stormer (K.U.) | ASTM D562 |
| Brookfield (cps) | ASTM D2196 |
| ICI Cone & Plate | ASTM D4287 |
| Freeze Thaw Stability | ASTM D2243 |
| Dry Times | ASTM D1640 (circular recorder) |
| Film Hardness | ASTM D3363 |
| Specular Gloss | ASTM D523 |
| Adhesion | ASTM D3359 |
| Flexibility | ASTM D2794 |
| Scrub testing | ASTM D2486 |
| Chemical Resistance | Test Method (s) |
| Dilute acid | ASTM D1308 (sec. 6.2) |
| Alkali solutions | ASTM D1308 (sec. 6.2) |
| De-ionized Water | ASTM D1308 (sec. 6.2) |
| Household cleaning solutions | ASTM D1308 (sec. 6.2) |
| House-hold stain producing products | ASTM D1308 (sec. 6.2) |
| Application Properties | Test Method (s) |
| Sag Resistance | ASTM D4400 |
| Flow and Leveling | ASTM D2801 |
| Accelerated Exposures | Test Method (s) |
| QCT Condensing Humidity Resistance | ASTM D4585 |
| UV Durabilty/Weathering Resistance | ASTM G53 |

The physical properties of the films are shown in Table 16.

TABLE 16

| Property | H (TPM) | I (EtLPK) |
|---|---|---|
| Dry Times (Room temperature) | | |
| Set-to-Touch | 24 min. | 24 min. |
| Surface Dry | 45 min. | 48 min. |
| Dry Through | 9.7 hrs. | 7.8 hrs. |
| Leneta SAG Resistance | 9 | 10 |
| Flow and Leveling | 3 | 3 |
| Brush and Roll Properties | Very Good | Very Good |
| Scrub Resistance | 1200 cycles | 700 cycles |
| Hardness Development[1] | | |
| 24 hours | >6B | >6B |
| 48 hours | >6B | >6B |
| 7 days | 3B | 3B |
| 2 weeks | 3B | 3B |
| Specular Gloss[1] | | |
| 85 Degree | 87.1 | 90.8 |
| 60 Degree | 28.9 | 31.2 |
| 20 Degree | 3.3 | 4.1 |
| Dry Film Adhesion[1] | 5B | 5B |
| Wet Film Adhesion[1] | 3B | 3B |
| Impact Flexibility (In/Lbs)[1] | | |
| Direct | 160 | 160 |
| Reverse | 160 | 160 |

[1]Testing was conducted on the Treated Cold Rolled Steel

The chemical resistance properties of the films are shown in Table 17. The test method used was the ASTM D-1308 (sec. 2)—covered spot test. Exposure to each reagent was 8 hours, and recovery time was 24 hours.

TABLE 17

| Reagent | H (TPM) | I (EtLPK) |
|---|---|---|
| Chemical Reagent | | |
| 5% Acetic Acid | Softens | Softens |
| | Full Recovery | Full Recovery |
| 5% Hydrochloric Acid | Softens | Softens |
| | Full Recovery | Full Recovery |
| 5% Acetic Acid | Softens | Softens |
| | Full Recovery | Full Recovery |
| 5% Nitric Acid | Softens | Softens |
| | Full Recovery | Full Recovery |
| 5% Lactic Acid | Softens | Softens |
| | Full Recovery | Full Recovery |
| 5% Ammonium Hydroxide | Softens | Softens |
| | Full Recovery | Full Recovery |
| 10% Sodium Hydroxide | Softens | Softens |
| | Full Recovery | Full Recovery |
| De-Ionized Water | Softens | Softens |
| | Full Recovery | Full Recovery |

The detergent resistance properties of the films are shown in Table 18. The test method used was the ASTM D-1308 (sec. 2)—covered spot test. Exposure to each reagent was 8 hours, and recovery time was 24 hours.

TABLE 18

| Detergent | H (TPM) | I (EtLPK) |
|---|---|---|
| 2% Tide Solution | Softens | Softens |
| | Full Recovery | Full Recovery |
| Windex Window Cleaner | Softens | Softens |
| | Full Recovery | Full Recovery |
| 5% Sodium Hypochlorite | Softens | Softens |
| | Full Recovery | Full Recovery |
| 2% Pine-Sol Solution | Softens | Softens |
| | Full Recovery | Full Recovery |
| 409 All-Purpose Cleaner | Softens + Loss of Gloss | Softens + Loss of Gloss |
| | Hardness is Recovered | Hardness is Recovered |
| Lysol Basin, Tub, & Tile | Softens + Loss of Gloss | Softens + Loss of Gloss |
| | Hardness is Recovered | Hardness is Recovered |

The solvent and fluid resistance properties of the films are shown in Table 19. The test method used was the ASTM D-1308 (sec. 2)—covered spot test. Exposure time was for 18 hours at room temperature.

TABLE 19

| Reagent | H (TPM) | I (EtLPK) |
|---|---|---|
| Grape Juice | Moderate Stain | Moderate Stain |
| Red Wine | Moderate Stain | Moderate Stain |
| Merthiolate | Severe Stain | Severe Stain |
| Ketchup | No Effect | No Effect |
| Mustard | Moderate Stain | Moderate Stain |

As can be seen from the data in Table 19, the EtLPK coalescing agent performed exceptionally well in this exterior latex paint, yielding equal (Viscosity, Dry Times, Flow and Leveling, Hardness, Dry Film Adhesion, Impact Flexibility, Dilute Alkali Resistance, Dilute Acid Resistance, Water Resistance, Stain Resistance) or superior (Dry through, Specular Gloss, and Sag Resistance) to TPM.

The correlation in both the low shear (10 & 20 RPM) and the high shear (ICI cone & plate) is exceptionally good as this indicates that the EtLPK coalescing agent is exhibiting penetration into the latex particles comparable to TPM.

However, the scrub resistance was notably less than that obtained in testing of the TPM-coalesced standard. The EtLPK-coalesced paint failed after 700 cycles, whereas the TPM-coalesced paint failed at 1200 cycles. In general, all other aspects of performance were basically equal with no significant variations in chemical testing, detergent resistance, or stain resistance. Both coatings exhibited excellent film adhesion and flexibility and relatively good application properties (brush and roll).

Example 8

EtLPK was investigated as a green/non-toxic coalescing agent for use in a paint based on an aqueous polyvinyl acetate copolymer aqueous emulsion, in particular a paint useful in interior applications. The EtLPK was used as a pound for pound replacement for TPM.

The base formulation was a flat wall paint based on Arkema UCAR 379G, which is a polyvinyl acetate copolymer emulsion supplied at 55% non-volatile (NV) in water. A 8.49 wt. % coalescent level (based on the weight of UCAR 379G solids) was used for evaluation of both TPM ("J") and EtLPK ("K").

Formulation details and typical coating constants for each formulation are shown in Table 20. The components of the basic grind were mixed well to activate the Natrosol Plus 330, Additives-1 was added and subjected to a high speed dispersion to a texture of 3-4 N.S., the Acrysol was added and mixed well, and Additives-2 was added and mixed well.

TABLE 20

| Material | J* Pounds | J* Gallons | K Pounds | K Gallons |
|---|---|---|---|---|
| Grind Base | | | | |
| De-Ionized Water | 295.0 | 35.43 | 295.0 | 35.43 |
| Propylene Glycol | 30.0 | 3.47 | 30.0 | 3.47 |
| Natrosol Plus 330 | 3.0 | 0.28 | 3.0 | 0.28 |
| Nuosept 95 | 2.0 | 0.21 | 2.0 | 0.21 |
| Colloid 643 | 3.0 | 0.42 | 3.0 | 0.42 |
| Additives-1 | | | | |
| Tamol 1124 | 7.0 | 0.71 | 7.0 | 0.71 |
| Tergitol NP-9 | 2.0 | 0.23 | 2.0 | 0.23 |
| AMP-95 | 2.0 | 0.25 | 2.0 | 0.25 |
| Ti-Pure R-960 Rutile Titanium Dioxide | 250.0 | 7.50 | 250.0 | 7.50 |
| Burgess No. 98 OptiWhiteate | 100.0 | 5.46 | 100.0 | 5.46 |
| Imsil 1240 Silica | 100.0 | 4.53 | 100.0 | 4.53 |
| Burgess 98 Kaolin Clay | 50.0 | 2.28 | 50.0 | 2.28 |
| Attagel 50 | 4.0 | 0.20 | 4.0 | 0.20 |
| Grind Base | | | | |
| Acrysol QR-708 | 6.0 | 0.67 | | |
| Additives-2 | | | | |
| UCAR 379 Vinyl Acetate Emulsion | 300.0 | 33.19 | 300.0 | 33.19 |
| TPM | 14.0 | 1.77 | — | — |
| EtLPK | — | — | 14.0 | 1.64 |
| Triton N-57 | 4.0 | 0.47 | 4.0 | 0.47 |
| Colloid 643 | 3.0 | 0.42 | 3.0 | 0.42 |
| Total | 1175 | 97.49 | 1175 | 97.36 |
| Typical Coating Constants | Amount | | Amount | |
| Total Weight Solids | 58.9% | | 58.9% | |
| Total Volume Solids | 46.8% | | 46.8% | |
| PVC | 43.8% | | 43.8% | |

TABLE 20-continued

| Material | J* Pounds | J* Gallons | K Pounds | K Gallons |
|---|---|---|---|---|
| VOC | | | | |
| Pounds per Gallon | | 1.07 | | 1.07 |
| Grams per Liter | | 128.1 | | 128.4 |
| pH | | 8.25 | | 8.02 |
| Freeze-Thaw Resistance | | 2 cycles | | 2 cycles |
| Viscosity Stormer (Kreb Units) | | | | |
| Initial | | 105 | | 100 |
| 72 hours | | 120 | | 112 |
| ICI Cone & Plate (at 72 hours) | | 1.933 | | 1.912 |

*Comparative

All paint films for testing were applied to primed drywall or iron phosphate-treated cold-rolled steel to a dry film thickness of 2.0-2.5 mils (51-64 micrometers) via brush and roll application. All applied films were then allowed to dry for a period of 14 days prior to any destructive testing.

The samples were tested for the physical properties, chemical, detergent, and stain resistance properties, and accelerated properties as shown in Table 21.

TABLE 21

| | Test Method (s) |
|---|---|
| Physical Properties Viscosity | |
| Stormer (K.U.) | ASTM D562 |
| Brookfield (cps) | ASTM D2196 |
| ICI Cone & Plate | ASTM D4287 |
| Freeze Thaw Stability | ASTM D2243 |
| Dry Times | ASTM D1640 (circular recorder) |
| Film Hardness | ASTM D3363 |
| Specular Gloss | ASTM D523 |
| Adhesion | ASTM D3359 |
| Flexibility | ASTM D2794 |
| Scrub testing | ASTM D2486 |
| Chemical Resistance | |
| Dilute acid | ASTM D1308 (sec. 6.2) |
| Alkali solutions | ASTM D1308 (sec. 6.2) |
| De-ionized Water | ASTM D1308 (sec. 6.2) |
| Household cleaning solutions | ASTM D1308 (sec. 6.2) |
| Household stain producing products | ASTM D1308 (sec. 6.2) |
| Application Properties | |
| Sag Resistance | ASTM D4400 |
| Flow and Leveling | ASTM D2801 |
| Accelerated Exposures | |
| QCT Condensing Humidity Resistance | ASTM D4585 |

The physical coating properties of the films are shown in Table 22. Substrates were primed drywall and iron phosphate-coated cold-rolled steel.

TABLE 22

| Property | J (TPM) | K (EtLPK) |
|---|---|---|
| Dry Times (Room temperature) | | |
| Set-to-Touch | 24 min. | 24 min. |
| Surface Dry | 45 min. | 48 min. |
| Dry Through | >12 hrs. | >12 hr |
| Leneta SAG Resistance | 13+ | 13+ |
| Flow and Leveling | 0 | 0 |

TABLE 22-continued

| Property | J (TPM) | K (EtLPK) |
|---|---|---|
| Brush and Roll Properties | Brush - Poor | Brush - Poor |
|  | Roll - Fair | Roll - Fair |
| Hardness Development[1] | | |
| 24 hours | >6B | >6B |
| 48 hours | >6B | >6B |
| 7 days | 6B | 6B |
| 2 weeks | 4B | 4B |
| Specular Gloss[1] | | |
| 85 Degree | 4.5 | 4.5 |
| 60 Degree | 2.4 | 2.4 |
| 20 Degree | 1.3 | 1.4 |
| Dry Film Adhesion (1) | 4B | 0B |
| Impact Flexibility (In/Lbs) (1) | | |
| Direct | 50 | 30 |
| Reverse | <5 | <5 |

[1]Testing was conducted on the Treated Cold Rolled Steel

The chemical and stain resistance properties of the films on primed drywall are shown in Table 23. The test method used was the ASTM D-1308 (sec. 2)—covered spot test. Exposure to each reagent was 4 hours, and recovery time was 24 hours.

TABLE 23

| Reagent | J (TPM) | K (EtLPK) |
|---|---|---|
| 5% Acetic Acid | Softens | Softens |
|  | Full Recovery | Full Recovery |
| 5% Hydrochloric Acid | Softens | Softens |
|  | Full Recovery | Full Recovery |
| 5% Acetic Acid | Softens | Softens |
|  | Full Recovery | Full Recovery |
| 5% Nitric Acid | Softens | Softens |
|  | Full Recovery | Full Recovery |
| 5% Lactic Acid | Softens | Softens |
|  | Full Recovery | Full Recovery |
| 5% Ammonium Hydroxide | Softens | Softens |
|  | Full Recovery | Full Recovery |
| 10% Sodium Hydroxide | Softens/Mod. Stain | Softens/Mod. Stain |
|  | Recovers Hardness | Recovers hardness |
|  | Stain Remains | Stain Remains |
| De-Ionized Water | Softens | Softens |
|  | Full Recovery | Full Recovery |

The detergent resistance properties of the films on primed drywall are shown in Table 24. The test method used was the ASTM D-1308 (sec. 2)—covered spot test. Exposure to each reagent was 4 hours, and recovery time was 24 hours.

TABLE 24

| Detergent | J (TPM) | K (EtLPK) |
|---|---|---|
| 2% Tide Solution | Softens | Softens |
|  | Full Recovery | Full Recovery |
| Windex Window Cleaner | Softens | Softens |
|  | Full Recovery | Full Recovery |
| 5% Sodium Hypochlorite | Softens | Softens |
|  | Full Recovery | Full Recovery |
| 2% Pine-Sol Solution | Softens | Softens |
|  | Full Recovery | Full Recovery |
| 409 All-Purpose Cleaner | Softens | Softens |
|  | Full Recovery | Full Recovery |
| Lysol Basin, Tub, & Tile | Softens | Softens |
|  | Full Recovery | Full Recovery |

The stain resistance properties of the films on primed drywall are shown in Table 25. The test method used was the ASTM D-1308 (sec. 2)—covered spot test. Exposure to each reagent was 18 hours at room temperature.

TABLE 25

| Reagent | J (TPM) | K (EtLPK) |
|---|---|---|
| Grape Juice | Severe Stain | Severe Stain |
| Red Wine | Moderate Stain | Moderate Stain |
| Merthiolate | Severe Stain | Severe Stain |
| Ketchup | No Effect | No Effect |
| Mustard | Very slight Stain | Very slight Stain |

The EtLPK coalescing agent performed acceptably, yielding equal or superior performance with respect to Viscosity, Dry Times (Set-to-Touch, Surface Dry, and Dry Through), Sag Resistance, Flow and Leveling, Hardness, Specular Gloss, Dilute Acid Resistance, Dilute Alkali Resistance, Water Resistance, Stain Resistance compared to the same formulations with TPM. As observed in the evaluation of the EtLPK in the interior/exterior trim paint the EtLPK-coalesced paint, the correlation in both the low shear (10 and 20 RPM) and the high shear (ICI cone & plate) was exceptionally good, indicating that the EtLPK coalescing agent is exhibiting penetration into the latex particles comparable to TPM.

The EtLPK-coalesced paint exhibited poorer adhesion, poorer flexibility, and a premature failure in scrub resistance. However, it should be noted that only the early scrub failure would relate directly to the intended application of this type of paint, as testing of adhesion and flexibility was conducted on treated cold rolled steel.

In general, all other aspects of performance were basically equal with no significant variations in chemical testing, detergent resistance, or stain resistance. Both coatings exhibited excessive sag resistance and, as a result, poor application properties as demonstrated by the lack of flow and leveling. This is a reflection on the base formulation, not the EtLPK.

Example 9

In this example, which is prophetic, a formulation for an industrial primer finish using a styrene-acrylic latex is shown in Table 26. The stages at which the components are mixed to manufacture formulation are also shown.

TABLE 26

| Material | Weight (lbs) | Stage |
|---|---|---|
| Water | 82.70 | Pigment grind stage: |
| Sodium Nitrate | 1.00 | HSD mixer* - mix |
|  |  | 20 minutes |
| Polycarbonate surfactant | 9.80 | |
| Nonionic surfactant | 2.50 | |
| Ammonia (28%) | 1.00 | |
| Q-Break ™ # 1 defoamer** | 4.00 | |
| Calcium carbonate | 298.00 | |
| Barium borate | 52.50 | |
| Titanium dioxide | 101.50 | |
| Water | 64.00 | |
| Butyl carbitol | 15.00 | |
| BIT biocide | 0.40 | |
| EtLPK | 32.00 | |
| Ethylene glycol | 10.00 | |
| PolyNova ™ ST-210** | 412.00 | Latex addition: |
| Water | 40.00 | Paddle mixer - mix 10 |
|  |  | minutes |
| Ammonia (28%) | 1.00 | |
| Nonionic surfactant | 4.00 | |
| Q-Break ™ #1 Defoamer | 3.00 | |
| HEC Thickener*** | 1.50 | Adjust stage: |
| HEUR Thickener**** | 2.50 | Paddle mixer - mix |
|  |  | 20 minutes |

TABLE 26-continued

| Material | Weight (lbs) | Stage |
|---|---|---|
| Q-Break ™ # 1 Defoamer | 3.00 | |
| Ammonia (28%) | 1.00 | |
| TOTAL: | 1141.40 lbs | |

**from Omega Specialty Products and Services, LLC, Cleveland, OH.
***Hydroxy ethyl cellulose
****Hydrophobically modified ethoxylated urethane The formulation can have excellent properties, including one or more of Viscosity, Dry Times (Set-to-Touch, Surface Dry, and Dry Through), Flow and Leveling, Hardness, Specular Gloss, Dilute Acid Resistance, Dilute Alkali Resistance, Water Resistance, and Stain Resistance.

Example 10

In this example, which is prophetic, a formulation for a semigloss latex paint using a styrene-acrylic latex is shown in Table 27.

TABLE 27

| Materials | Pounds |
|---|---|
| Pigment Grind | |
| Water | 110.0 |
| Pigment disperser MD20** | 6.0 |
| Propylene glycol | 5.0 |
| Surfynol DF-210* | 1.0 |
| Titanium dioxide | 227.5 |
| Calcium carbonate | 40.0 |
| Letdown | |
| Acronal 296D** | 611.8 |
| Water | 51.9 |
| Surfynol DF-210 | 1.4 |
| EtLPK | 20.0 |
| Propylene glycol | 7.0 |

*From Air Products
**From BASF

Example 11

Although the coalescing solvent of formula (1), and specifically formula (1a), have been described in latex paint compositions, similar formulations containing the coalescing solvent of formula (1), and specifically formula (1a), are applicable to a broad array of latex compositions, including but not limited to latex adhesive compositions, latex sealant compositions, latex mastic compositions, latex caulk compositions, and latex ink compositions.

The following tables show exemplary prophetic formulations for caulk, sealant, adhesive, and mastic formulations.

Clear Sealant

| Component | % by weight |
|---|---|
| UCAR Latex 9192* | 93.27 |
| TERGITOL ™ NP-4 Nonionic Surfactant** | 0.15 |
| Foamaster NXZ defoamer† | 0.33 |
| Propylene Glycol | 2.70 |
| EtLPK | 0.80 |
| Mineral Spirits | 1.56 |
| Tinuvin 1130 UV stabilizer† | 0.06 |
| Tinuvin 292 UV stabilizer† | 0.06 |

-continued

Clear Sealant

| Component | % by weight |
|---|---|
| Silquest A-187 silane adhesion promoter†† | 0.06 |
| Fumed Silica | 0.21 |
| Ammonium Hydroxide (28%) | 0.80 |

*Arkema Inc., King of Prussia, Pennsylvania
**The Dow Chemical Company, Midland, MI
†BASF, Ludwigshafen, Germany
††Momentive Performance Materials, Columbus, OH Premium Performance High Solids Caulk

| Component | % by weight |
|---|---|
| UCAR Latex 154S* | 38.45 |
| TRITON X-405 Nonionic Surfactant** | 0.71 |
| Tamol 850** | 0.16 |
| Santicizer 160† | 9.08 |
| EtLPK | 1.55 |
| Ethylene Glycol | 1.05 |
| Silquest A-187 silane adhesion promoter†† | 0.10 |
| Atomite Calcium Carbonate‡ | 48.70 |
| Ti-Pure R-902‡‡ | 0.20 |

*Arkema Inc., King of Prussia, Pennsylvania
**The Dow Chemical Company, Midland, MI
†Ferro Corporation, Walton Hills, OH
††Momentive Performance Materials, Columbus, OH
‡Imerys Performance Minerals, Roswell, GA
‡‡DuPont Company, Wilmington, DE Ceramic Tile Adhesive

| Component | % by weight |
|---|---|
| UCAR Latex 145* | 21.0 |
| Benzoflex 9-88** | 1.00 |
| Water | 5.91 |
| Foamaster NXZ defoamer† | 0.02 |
| TRITON Nonionic Surfactant X-405†† | 0.60 |
| Propylene Glycol | 1.86 |
| EtLPK | 1.72 |
| Kathon LX†† | 0.07 |
| Tamol 850†† | 0.33 |
| Drikalite Calcium Carbonate‡ | 52.40 |
| Nytal 300 talc‡‡ | 8.07 |
| Ammonium Hydroxide, 28% Aqueous Solution | 0.33 |
| UCAR Thickener 146†† | 2.31 |
| Water | 4.38 |

*Arkema Inc., King of Prussia, Pennsylvania
**Eastman Chemical Company, Kingsport, TN
†BASF, Ludwigshafen, Germany
††The Dow Chemical Company, Midland, MI
‡Imerys Performance Minerals, Roswell, GA
‡‡RT Vanderbilt Company, Norwalk, CT Weather Barrier Mastic Formulation

| Component | % by weight |
|---|---|
| Pigment Grind | |
| Water | 12.47 |
| CELLOSIZE ® Hydroxyethyl Cellulose QP-4400H* | 0.33 |
| KTPP | 0.08 |
| Ethylene Glycol | 1.66 |
| Foamaster NXZ defoamer** | 0.13 |
| Ti-Pure R-902† | 5.15 |
| Atomite Calcium Carbonate†† | 33.83 |

-continued

Weather Barrier Mastic Formulation

| Component | % by weight |
|---|---|
| Zinc oxide | 3.32 |
| Skane M-8* | 0.25 |
| Tamol 850* | 0.39 |
| Letdown | |
| UCAR ® Latex 163S‡ | 41.73 |
| EtLPK | 0.5 |
| Foamaster NXZ defoamer** | 0.16 |

*The Dow Chemical Company, Midland, MI
**BASF, Ludwigshafen, Germany
†DuPont Company, Wilmington, DE
††Imerys Performance Minerals, Roswell, GA
‡Arkema Inc., King of Prussia, Pennsylvania The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The endpoints of all ranges directed to the same component or property are inclusive of the endpoint and independently combinable.

Unless otherwise defined, all terms (including technical and scientific terms) used herein have the same meaning as commonly understood by one of ordinary skill in the art to which this invention belongs. The term "paint" includes any protective exterior coatings that are also known as, for example, lacquer, electropaint, shellac, top coat, base coat, color coat, and the like.

The compounds made by the above-described methods have, in embodiments, one or more isomers. Where an isomer can exist, it should be understood that the invention embodies methods that form any isomer thereof, including any stereoisomer, any conformational isomer, and any cis, trans isomer; isolated isomers thereof; and mixtures thereof.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. Alkyl groups may be straight-chained or branched. Throughout the specification, reference is made to various bivalent groups. Such groups are the same as the monovalent groups that are similarly named, and are typically indicated with an "ene" suffix. For example, a C1 to C6 alkylene group is a bivalent linking group having the same structure as a C1 to C6 alkyl group.

All cited patents, patent applications, and other references are incorporated herein by reference in their entirety.

The various embodiments described above are provided by way of illustration only and should not be construed to limit the claims attached hereto. The present invention can suitably comprise, consist of, or consist essentially of, any of the disclosed or recited elements. Thus, the invention illustratively disclosed herein can be suitably practiced in the absence of any element which is not specifically disclosed herein. Various modifications and changes will be recognized that can be made without following the example embodiments and applications illustrated and described herein, and without departing from the true spirit and scope of the following claims.

What is claimed is:

1. A latex coating composition, comprising
a latex polymer binder;
water; and
a ketal adduct of formula (1)

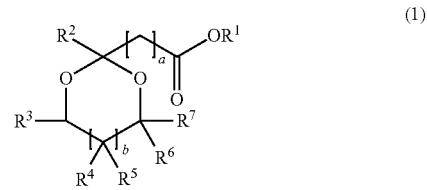

wherein
$R^1$ is C1-6 alkyl,
$R^2$ is hydrogen or C1-3 alkyl,
each $R^3$, $R^4$, and $R^5$ is independently hydrogen or C1-6 alkyl,
$R^6$ and $R^7$ are each independently hydrogen or C1-6 alkyl,
a is 0-3, and
b is 0-1,
wherein the latex polymer binder comprises an emulsion polymer containing units derived from polymerization of acrylic acid, acrylic acid C1-4 alkyl ester, methacrylic acid, or methacrylic acid C1-4 alkyl ester, optionally with units derived from styrene, α-methyl styrene, vinyl chloride, acrylonitrile, methacrylonitrile, ureido methacrylate, vinyl acetate, itaconic acid, crotonic acid, maleic acid, fumaric acid, ethylene, hydroxyethyl acrylate, hydroxypropyl acrylate, a C4-8 conjugated diene, vinyl versatate or a combination thereof.

2. The latex coating composition of claim 1, wherein $R^1$ is C1-6 alkyl, $R^2$ is methyl, each $R^3$, $R^4$, and $R^5$ are each independently hydrogen or C1-3 alkyl, $R^6$ is hydrogen or C1-6 alkyl, $R^7$ is hydrogen, a is 1-3, and b is 0-1.

3. The latex coating composition of claim 1, wherein $R^1$ is C1-6 alkyl, $R^2$ is methyl, $R^3$ is hydrogen, $R^6$ is hydrogen or C1-3 alkyl, $R^7$ is hydrogen, a is 2-3, and b is 0.

4. The latex coating composition of claim 1, wherein $R^1$ is C1-4 alkyl, $R^2$ is methyl, $R^3$ is hydrogen, $R^6$ is hydrogen, methyl, or ethyl, $R^7$ is hydrogen, a is 2, and b is 0.

5. The latex coating composition of claim 1, wherein the ketal adduct is of formula (1a)

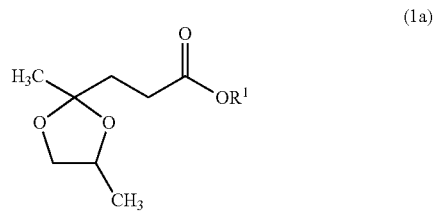

wherein $R^1$ is a C1-4 alkyl.

6. The latex coating composition of claim 1, wherein $R^1$ is ethyl.

7. The latex coating composition of claim 1, wherein $R^1$ is isopropyl.

8. The latex coating composition of claim 1, wherein $R^1$ is butyl.

9. The latex coating composition of claim 1, comprising 0.1 to 30 wt. %, of the ketal adduct, based on the total weight of the latex coating composition.

10. The latex coating composition of claim 1, comprising 1 to 15 wt. % of the ketal adduct, based on the total weight of the latex coating composition.

11. The latex coating composition of claim 1, wherein the latex polymer binder comprises an acrylic polymer, styrene-acrylic copolymer, vinyl-acrylic copolymer, or acrylated ethylene-vinyl acetate emulsion copolymer.

12. The latex coating composition of claim 1, wherein the latex polymer binder is a paint latex polymer binder, and further comprising a pigment.

13. The latex coating composition of claim 1, wherein the latex polymer binder is a caulk polymer binder.

14. The latex coating composition of claim 1, wherein the latex polymer binder is a sealant polymer binder.

15. The latex coating composition of claim 1, wherein the latex polymer binder is an adhesive polymer binder.

16. The latex coating composition of claim 1, wherein the latex polymer binder is a mastic polymer binder.

17. The latex coating composition of claim 1, wherein the latex polymer binder is an ink latex polymer binder, and further comprising a pigment, dye, or combination thereof.

18. A method of preparing the latex coating composition of claim 1, comprising:
    combining an aqueous latex polymer binder emulsion and the ketal adduct of formula 1.

19. A method of coating a substrate, comprising:
    contacting the latex coating composition of claim 1 with a surface of the substrate to form a coating; and
    drying the coating.

20. A coated substrate made by the method of claim 19.

21. A latex coating composition, comprising
    a latex polymer binder;
    water; and
    a ketal adduct of formula (1)

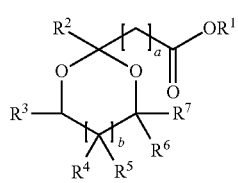

(1)

wherein
    $R^1$ is C1-6 alkyl,
    $R^2$ is hydrogen or C1-3 alkyl,
    each $R^3$, $R^4$, and $R^5$ is independently hydrogen or C1-6 alkyl,
    $R^6$ and $R^7$ are each independently hydrogen or C1-6 alkyl,
    a is 0-3, and
    b is 0-1,
    wherein the latex polymer binder comprises an acrylic polymer, styrene-acrylic copolymer, vinyl-acrylic copolymer, or acrylated ethylene-vinyl acetate emulsion copolymer.

22. The latex coating composition of claim 21, wherein $R^1$ is C1-6 alkyl, $R^2$ is methyl, each $R^3$, $R^4$, and $R^5$ are each independently hydrogen or C1-3 alkyl, $R^6$ is hydrogen or C1-6 alkyl, $R^7$ is hydrogen, a is 1-3, and b is 0-1.

23. The latex coating composition of claim 21, wherein $R^1$ is C1-6 alkyl, $R^2$ is methyl, $R^3$ is hydrogen, $R^6$ is hydrogen or C1-3 alkyl, $R^7$ is hydrogen, a is 2-3, and b is 0.

24. The latex coating composition of claim 21, wherein $R^1$ is C1-4 alkyl, $R^2$ is methyl, $R^3$ is hydrogen, $R^6$ is hydrogen, methyl, or ethyl, $R^7$ is hydrogen, a is 2, and b is 0.

25. The latex coating composition of claim 22, wherein the ketal adduct is of formula (1a)

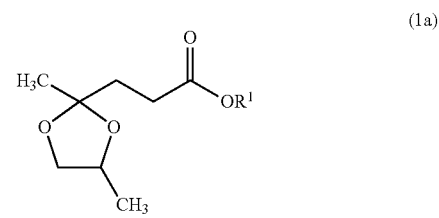

(1a)

wherein $R^1$ is a C1-4 alkyl.

26. The latex coating composition of claim 21, wherein $R^1$ is ethyl.

27. The latex coating composition of claim 21, wherein $R^1$ is isopropyl.

28. The latex coating composition of claim 21, wherein $R^1$ is butyl.

29. The latex coating composition of claim 21, comprising 0.1 to 30 wt. %, of the ketal adduct, based on the total weight of the latex coating composition.

30. The latex coating composition of claim 21, comprising 1 to 15 wt. % of the ketal adduct, based on the total weight of the latex coating composition.

31. The latex coating composition of claim 21, wherein the latex polymer binder is a paint latex polymer binder, and further comprising a pigment.

32. The latex coating composition of claim 21, wherein the latex polymer binder is a caulk polymer binder.

33. The latex coating composition of claim 21, wherein the latex polymer binder is a sealant polymer binder.

34. The latex coating composition of claim 21, wherein the latex polymer binder is an adhesive polymer binder.

35. The latex coating composition of claim 21, wherein the latex polymer binder is a mastic polymer binder.

36. The latex coating composition of claim 21, wherein the latex polymer binder is an ink latex polymer binder, and further comprising a pigment, dye, or combination thereof.

37. A method of preparing the latex coating composition of claim 21, comprising:
    combining an aqueous latex polymer binder emulsion and the ketal adduct of formula 1.

38. A method of coating a substrate, comprising:
    contacting the latex coating composition of claim 21 with a surface of the substrate to form a coating; and
    drying the coating.

39. A coated substrate made by the method of claim 38.

* * * * *